United States Patent
Taverner et al.

(10) Patent No.: US 10,175,131 B2
(45) Date of Patent: Jan. 8, 2019

(54) SMALL PROFILE PRESSURE AND TEMPERATURE GAUGES

(71) Applicant: Weatherford Technology Holdings, LLC, Houston, TX (US)

(72) Inventors: Domino Taverner, Delray Beach, FL (US); John J. Grunbeck, Northford, CT (US); James R. Dunphy, Jamestown, RI (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 15/478,781

(22) Filed: Apr. 4, 2017

(65) Prior Publication Data

US 2017/0205302 A1 Jul. 20, 2017

Related U.S. Application Data

(62) Division of application No. 14/330,338, filed on Jul. 14, 2014, now Pat. No. 9,677,963.

(51) Int. Cl.
*G01N 21/00* (2006.01)
*G01L 11/02* (2006.01)
(Continued)

(52) U.S. Cl.
CPC ............ *G01L 11/025* (2013.01); *E21B 47/01* (2013.01); *E21B 47/011* (2013.01); *E21B 47/06* (2013.01);
(Continued)

(58) Field of Classification Search
CPC ........... G01M 11/3145; G01M 11/335; G01M 11/33; G01M 11/3109; G01M 11/338
(Continued)

(56) References Cited

U.S. PATENT DOCUMENTS 4,420,251 A 12/1983 James et al.
6,982,996 B1 1/2006 Putnam et al.
(Continued)

FOREIGN PATENT DOCUMENTS

GB 2443575 A 5/2008
WO 00/33046 A1 6/2000
(Continued)

OTHER PUBLICATIONS

Great Britain Search Report dated Jan. 11, 2016, corresponding to Application No. GB1511839.1.
(Continued)

*Primary Examiner* — Md M Rahman
(74) *Attorney, Agent, or Firm* — Patterson & Sheridan, LLP

(57) ABSTRACT

Small profile apparatus for pressure and/or temperature sensing within a wellbore are provided. The apparatus may include optical sensing assemblies designed for inclusion in traditional or coiled production tubing deployments and suitable for use in high pressure, high temperature environments. One example assembly generally includes an outer housing, an inner housing at least partially disposed in the outer housing, a port for fluid communication between an internal volume of the inner housing and a volume external to the outer housing, and a large diameter optical waveguide disposed in the internal volume of the inner housing. The waveguide includes a first portion with a first grating and a second portion with a second grating, wherein the outer diameter of the large diameter optical waveguide is at least 300 μm.

21 Claims, 9 Drawing Sheets

(51) Int. Cl.
  *G02B 6/34* (2006.01)
  *G01K 11/32* (2006.01)
  *E21B 47/01* (2012.01)
  *E21B 47/06* (2012.01)
  *G02B 6/02* (2006.01)

(52) U.S. Cl.
  CPC .......... *G01K 11/32* (2013.01); *G02B 6/02076* (2013.01); *G02B 6/02209* (2013.01); *G02B 6/34* (2013.01); *G02B 6/02057* (2013.01)

(58) Field of Classification Search
  USPC ....................................................... 356/73.1
  See application file for complete search history.

(56) References Cited

U.S. PATENT DOCUMENTS

| | | |
|---|---|---|
| 7,302,123 B2 | 11/2007 | Jones |
| 2002/0154860 A1 | 10/2002 | Fernald et al. |
| 2002/0194917 A1 | 12/2002 | Fernald et al. |
| 2003/0174948 A1 | 9/2003 | Davis et al. |
| 2007/0003206 A1 | 1/2007 | Dunphy et al. |
| 2009/0003759 A1 | 1/2009 | Boyd |
| 2013/0253854 A1 | 9/2013 | Chen et al. |
| 2014/0202253 A1 | 7/2014 | Harpin et al. |
| 2014/0241693 A1* | 8/2014 | Engel ................... G02B 6/4248 385/138 |
| 2014/0270625 A1 | 9/2014 | Warren et al. |
| 2014/0338438 A1* | 11/2014 | Fripp .................... G01H 9/004 73/152.16 |
| 2017/0205302 A1* | 7/2017 | Taverner ............... G01L 11/025 |

FOREIGN PATENT DOCUMENTS

| | | |
|---|---|---|
| WO | 2000/033034 A1 | 6/2000 |
| WO | 2013/134575 A1 | 9/2013 |

OTHER PUBLICATIONS

Great Britain Examination Report dated Feb. 9, 2017, corresponding to Application No. GB1511839.1.
Great Britain Combined Search and Examination Report dated Aug. 16, 2017, corresponding to Application No. 1711889.4.

* cited by examiner

SMALL PROFILE PRESSURE AND TEMPERATURE GAUGES

CLAIM OF PRIORITY UNDER 35 U.S.C. § 119

This application is a divisional of U.S. patent application Ser. No. 14/330,338, filed Jul. 14, 2014 and entitled "Small Profile Pressure and Temperature Gauges," which is herein incorporated by reference in its entirety.

BACKGROUND OF THE INVENTION

Field of the Invention

Embodiments of the invention generally relate to sensors and, more particularly, to small form-factor pressure or temperature sensing assemblies, suitable for hydrocarbon production.

Description of the Related Art

Many industries and applications utilize sensors to measure parameters, such as pressure or temperature. In some cases, such sensors may utilize optical waveguides having a grating, such as a Bragg gratings or Fabry-Perot cavities, and the optical waveguides may have a characteristic wavelength reflectivity at a given pressure and/or temperature. As pressure and/or temperature change, the reflectivity characteristics of an optical waveguide may change in a predictable manner. Based on pressure and/or temperature-induced changes in the grating of a waveguide, a sensing device can determine changes in pressure and temperature by injecting a light pulse into an optical waveguide and measuring the reflected wavelength.

Such optical sensors may be used for sensing pressure and/or temperature in production tubing located in a wellbore completion for producing hydrocarbons. Traditional tubing strings, in which multiple lengths of tubing are coupled together, or coiled tubing may be deployed in the wellbore completion. In coiled tubing deployments, a length of tubing, which may be of a length appropriate for the depth of the completion, may be spooled onto a take-up reel. During installation, the tubing can be straightened and, using an injector head, can be run into the completion. Because coiled tubing is meant to be spooled onto and unspooled from a reel, the diameter of a coiled tube may be less than the diameter of traditional production tubing.

Several challenges exist with constructing optical sensors for use in production tubing, especially for coiled tubing deployments. One of these challenges involves the size of such sensors. While optical sensors for installation in traditional production tubing exist, various factors, including susceptibility of the glass fiber to damage and breakage due to its small size, flexibility, and brittle nature, make it difficult to build optical sensors for installation in more compact production tubing (e.g., coiled tubing deployments). For example, a conventional sensing gauge may be ¾" in diameter and about 15" long and may not fit within a coiled tubing.

There is a need, therefore, for a compact optical sensor assembly capable of operating in relatively high temperature and high pressure environments and deployable in various types of traditional and coiled production tubing.

SUMMARY OF THE INVENTION

Embodiments of the present invention generally relate to pressure and/or temperature sensing configurations that may be packaged in a small diameter form-factor. Such configurations may be suitable for use in coiled tubing employed for hydrocarbon production.

One embodiment of the invention is an optical sensing assembly. The assembly generally includes a housing having a divider for separating a first volume from a second volume inside the housing, a compressible element disposed in the first volume, wherein a first end of the compressible element is coupled to the divider and a second end of the compressible element is sealed, and a large diameter optical waveguide disposed in an internal volume of the compressible element. The waveguide typically includes a first portion with a first grating and a second portion with a second grating, wherein the first portion has a greater outer diameter than the second portion and wherein the outer diameter of the second portion is at least 300 µm.

Another embodiment of the invention is an optical sensing assembly. The assembly generally includes a housing; wherein a portion of a wall of the housing includes a flexible member; a compressible frame assembly disposed in the housing, wherein a first end of the frame assembly is coupled to the flexible member and wherein a second end of the frame assembly is coupled to an inner surface of the housing; and a large diameter optical waveguide held by the frame assembly and having a first grating disposed in a first portion of the waveguide and a second grating disposed in a second portion of the waveguide, wherein an outer diameter of the large diameter waveguide is at least 300 µm.

Yet another embodiment of the invention is an optical sensing assembly. The assembly generally includes a housing (including a divider for separating a first volume from a second volume inside the housing and a port disposed in an end of the housing); a compressible element disposed in the first volume, wherein a first end of the compressible element is coupled to the end of the housing, wherein a second end of the compressible element is sealed, and wherein an internal volume of the compressible element is in fluid communication with the port; and a large diameter optical waveguide coupled to the divider and to the second end of the compressible element. The waveguide typically has a first grating disposed in a first portion of the waveguide and a second grating disposed in a second portion of the waveguide. An outer diameter of the large diameter optical waveguide is at least 300 µm.

Yet another embodiment of the invention is an optical sensing assembly. The assembly generally includes an outer housing (including a divider for separating a first volume from a second volume inside the outer housing and a port through the outer housing to the first volume); a compressible element disposed in the first volume, wherein a first end of the compressible element is coupled to the divider and wherein a second end of the compressible element is sealed; an inner housing disposed in the second volume, wherein a first end of the inner housing is coupled to the divider; a large diameter optical waveguide at least partially disposed in the inner housing and coupled to a second end of the inner housing; and a rod disposed in an internal volume of the compressible element and passing through a bore in the divider, wherein a first end of the rod is coupled to the second end of the compressible element and a second end of the rod is coupled to the large diameter waveguide. The waveguide typically has a first portion with a first grating and a second portion with a second grating. An outer diameter of the large diameter optical waveguide is at least 300 µm.

Yet another embodiment of the invention is an optical sensing assembly. The assembly generally includes a housing having a port through a wall of the housing; an expandable tube having an internal volume and an inlet coupled to the port of the housing for fluid communication between the internal volume of the expandable tube and an external volume of the housing; first and second holding members coupled to the expandable tube; and a large diameter optical waveguide held by the first and second holding members. The waveguide typically has a first portion with a first grating and a second portion with a second grating. An outer diameter of the large diameter optical waveguide is at least 300 µm.

Yet another embodiment of the invention is an optical sensing assembly. The assembly generally includes an outer housing; an inner housing at least partially disposed in the outer housing; a port for fluid communication between an internal volume of the inner housing and a volume external to the outer housing; and a large diameter waveguide disposed in the internal volume of the inner housing. The waveguide typically has a first portion with a first grating and a second portion with a second grating. An outer diameter of the large diameter optical waveguide is at least 300 µm.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide apparatus for performing pressure and/or temperature sensing within a wellbore. The apparatus may be suitable for inclusion in traditional tubing or in coiled tubing deployments and may be suitable for use in high pressure, high temperature environments, such as a downhole environment having temperatures in excess of 250° C.

Figure 1:
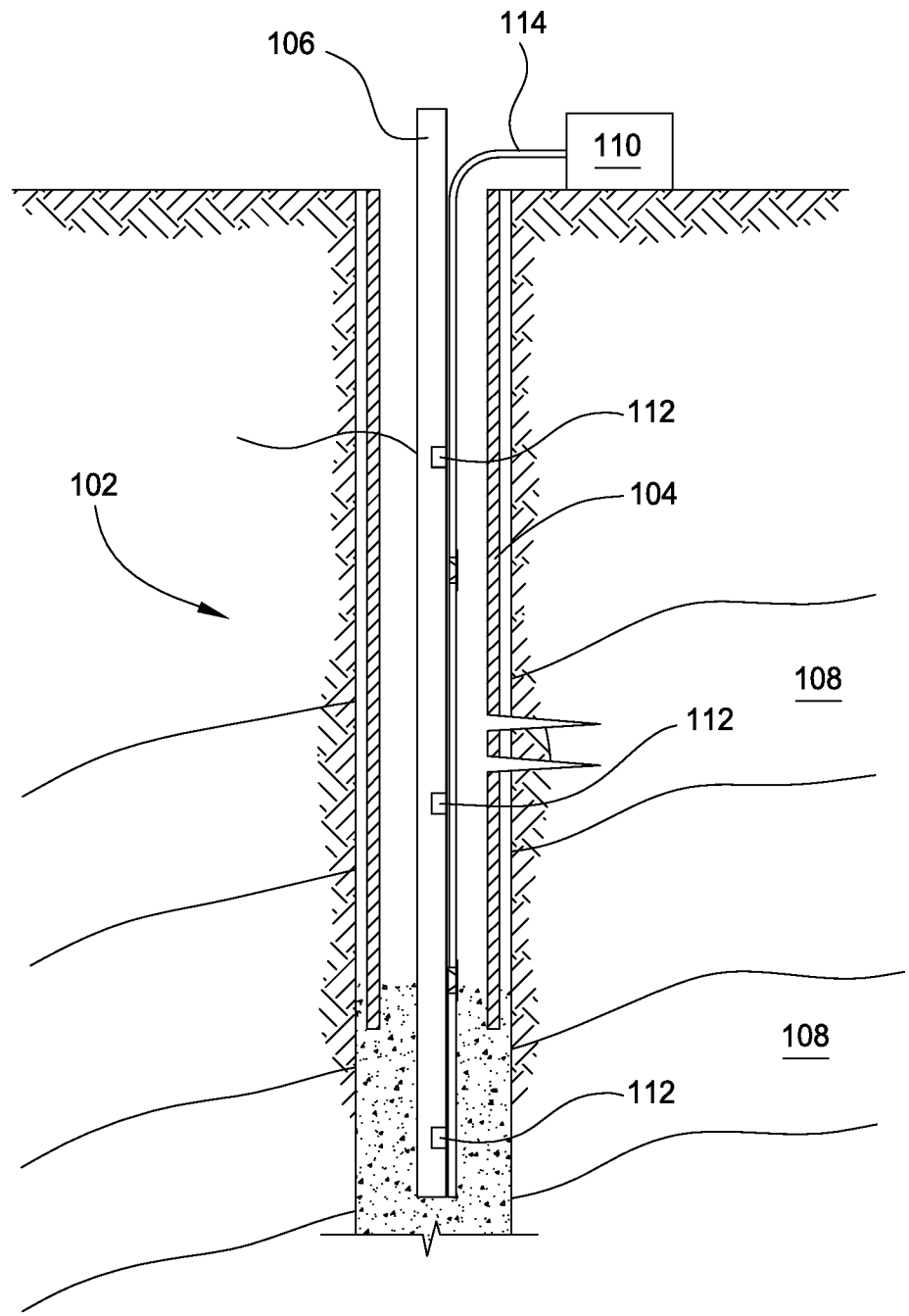
FIG. 1 is a schematic cross-sectional view of an example wellbore according to an embodiment of the present invention.

FIG. 1 illustrates a schematic cross-sectional view of an example wellbore 102. Wellbore 102 may have a casing 104 disposed within, through which production tubing 106 may be deployed as part of a wellbore completion. Hydrocarbons located in a reservoir 108 may be produced through tubing 106 using natural lift or artificial lift means. A sensing unit 110 may be used to perform sensing of a variety of parameters in a wellbore. Sensing unit 110 may be, for example, an optical system comprising an optic signal generator and a receiver for receiving data from sensors in the wellbore.

The sensing unit 110 may be connectively coupled to one or more sensors 112 positioned in the production tubing 106 via an optical waveguide, such as an optical fiber 114 or a cable including multiple optical fibers. Sensors 112 may be, for example, a pressure and/or temperature gauge. For example, one sensor 112 may be positioned in a first production zone (e.g., for producing gaseous products), a second sensor 112 may be positioned in a second production zone (e.g., for producing hydrocarbon liquids), and so on. For some embodiments, the sensing unit 110 may utilize a single fiber within a suspended cable deployed in production tubing 106, in a cable coupled to the outside of the production tubing 106 (i.e., in the annulus between the casing 104 and the tubing 106), or in a cable external to the casing 104.

Sensors 112 may be single-ended or pass-through sensors. A single-ended sensor has a single optical waveguide coupled to the sensor and is typically positioned at the end of this optical waveguide. A pulse of light may enter the sensor through the single optical waveguide, and reflected light may be received at sensing unit 110 via the single optical waveguide. A pass-through sensor may be coupled (e.g., via a pigtail) to an optical waveguide at each end of the sensor, for example. Light may enter the sensor through a first optical waveguide, pass through the sensor to a second waveguide, and be transmitted to another sensor coupled to the second waveguide. Reflections from the sensor(s) may travel through the first optical waveguide to sensing unit 110.

For some embodiments, a coupler may be connected with a single-ended sensor in order to have light travel to one or more additional sensors linked to the single-ended sensor. By using one or more couplers, multiple single-ended sensors may be linked.

Example Sensing Assembly with Encased Cane Element

Figure 2:
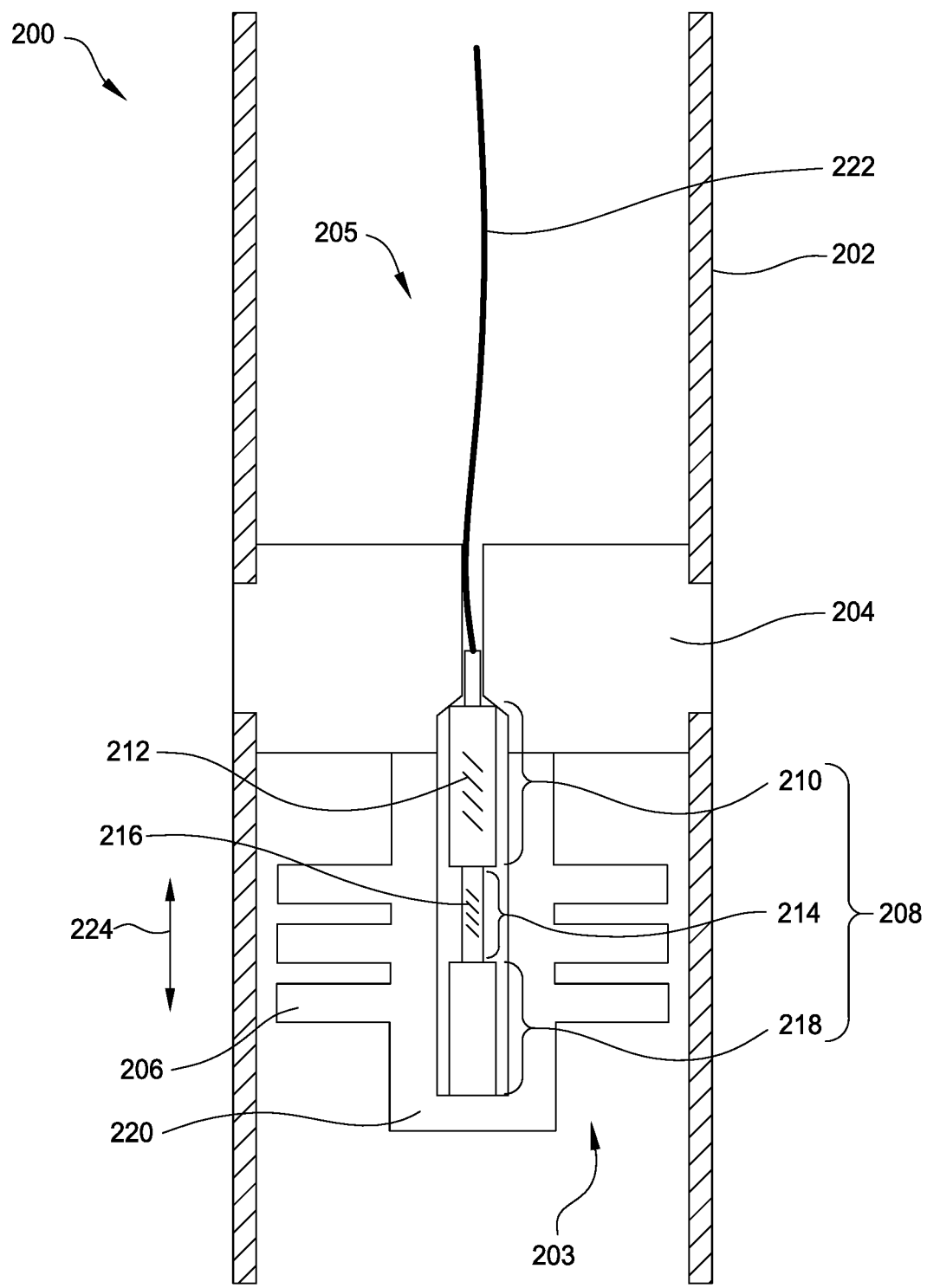
FIG. 2 is a schematic cross-sectional view of a small profile optical sensing assembly with an optical sensor disposed in a compressible element and axially reactive to pressure changes, according to an embodiment of the present invention.

FIG. 2 illustrates an embodiment of a small profile optical sensing assembly 200 suitable for measuring pressure and/or temperature. Sensing assembly 200 may include a housing 202 having a divider 204 that may separate a first volume 203 from a second volume 205 in housing 202. A compressible element 206 (e.g., a bellows assembly) may be disposed in the first volume 203. A first end of compressible element 206 may be attached or otherwise mechanically coupled to divider 204, and a second end of compressible element 206 may be sealed (e.g., with an end cap 220). Wellbore fluids may be present in at least the first volume 203, whereas the second volume 205 is isolated from the wellbore fluids.

A large diameter optical waveguide 208 may be disposed in an internal volume of the compressible element. As used herein, a large diameter optical waveguide (also referred to as a "cane" waveguide due to its relatively rigid nature compared to an optical fiber) generally refers to a waveguide having a cladding surrounding a core, wherein an outer diameter of the cladding is at least 300 μm. Optical waveguide 208 may have a first portion 210 with a first Bragg grating 212 and a second portion 214 with a second Bragg grating 216. The first portion 210 has a greater outer diameter than the second portion 214, and the outer diameter of second portion 214 may be at least 300 μm. For some embodiments, the large diameter optical waveguide 208 may be a monolithic glass assembly, composed of a single piece of glass or multiple pieces fused together to form the monolith.

In an embodiment, sensing assembly 200 may be packaged in a ⅜ inch (⅜") or smaller outer diameter housing 202. In this manner, the sensing assembly 200 is suitable for deployment in coiled tubing, as well as in traditional production tubing.

In an embodiment, compressible element 206 is a bellows assembly. The bellows assembly may be, for example, an edge-welded bellows (also referred to as diaphragm bellows), convoluted bellows (also known as formed bellows), or any other type of bellows assembly appropriate for use in a downhole production environment. The bellows assembly provides fluid isolation between the first and second volumes 203, 205 and amplification of the fluid pressure in the first volume 203.

In an embodiment, large diameter optical waveguide 208 may have a "dog-bone" shape, which has two piston portions connected by a piston rod as illustrated in FIG. 2. First portion 210 of the waveguide 208 may be a piston portion, and second portion 214 may be a narrow portion (i.e., the piston rod) as depicted. Large diameter optical waveguide 208 may further include a third portion 218, which may have a greater outer diameter than second portion 214. The outer diameter of the first and third portions may be equal. Third portion 218 may be configured to interact with the second end of compressible element 206.

For some embodiments, first portion 210 of optical waveguide 208 may be coupled (e.g., via a pigtail) to an optical fiber 222 that propagates light to interrogate the first and second gratings 212, 216. In an embodiment, optical fiber 222 may pass from the waveguide 208 through a bore in divider 204 to the cable with optical fiber 114, such that the gratings 212, 216 may be interrogated by the sensing unit 110.

For some embodiments, divider 204 may include a frustoconical seat for mating with the first portion 210 of optical waveguide 208. When compressible element 206 is compressed axially 224, large diameter optical waveguide 208 may be forced axially against the seat. A first end of compressible element 206 may be mounted to divider 204 such that compressible element 206 compresses or expands axially in response to changes in pressure of wellbore fluids in the first volume 203.

For some embodiments, large diameter optical waveguide 208 may be disposed in the internal volume of compressible element 206 such that compression or expansion of compressible element 206 increases or decreases strain on the waveguide 208, thereby changing the characteristic wavelengths of the first and second gratings.

During operation, sensing assembly 200 may be positioned within production tubing 106 such that one end of compressible element 206 is in fluid communication with wellbore fluids within the production tubing, which may impart axial loading on compressible element 206. As the pressure within the wellbore varies, the axial loading on compressible element 206 may also change, which may in turn alter the compression imparted to optical waveguide 208 and, hence, the characteristic wavelengths of gratings 212 and 216. Interrogation of gratings 212 and 216 by sensing unit 110 may thus be used to detect changes in pressure and/or temperature at the location of sensing assembly 200.

Example Sensing Assembly with Frame-Mounted Cane Element with Side Loading

Figure 3:
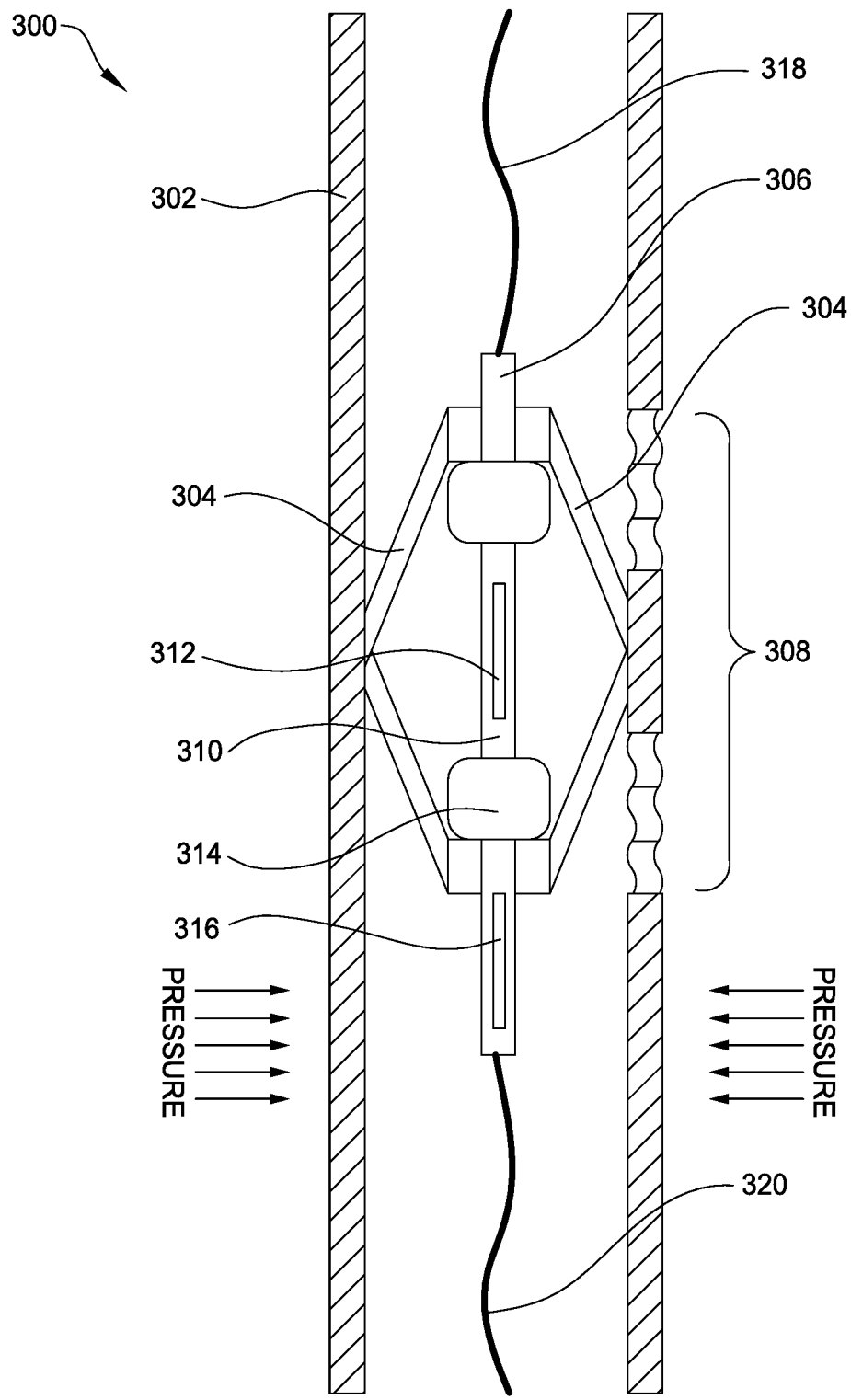
FIG. 3 is a schematic cross-sectional view of a small profile optical sensing assembly with an optical sensor held by a frame assembly such that radial pressure changes are translated to axial forces on the sensor, according to an embodiment of the present invention.

FIG. 3 illustrates another embodiment of a small profile pressure and temperature sensing assembly 300. Sensing assembly 300 may be one of the sensors 112 deployed in the production tubing 106 as described above with respect to FIG. 1. As such, sensing assembly 300 may be designed to operate in environments having an ambient temperature greater than 250° C.

Sensing assembly 300 may include a housing 302, a compressible frame assembly 304, and a large diameter optical waveguide 306. In some embodiments, housing 302 may be composed of an outer tubing having an outer diameter of at most ⅜ inches, which may be suitable for deploying the assembly in coiled tubing. A portion of a wall of housing 302 may comprise a flexible member 308 configured to respond to changes in pressure external to the housing. For example, flexible member 308 may be a bellows assembly or a diaphragm. Compressible frame assembly 304 may be disposed in housing 302. A first end of frame assembly 304 may be coupled to flexible member 308, and a second end of frame assembly 304 may be coupled to an inner surface of housing 302, which may be opposite the flexible member 308.

Large diameter optical waveguide 306 may be held by frame assembly 304 and may have a first grating 312 disposed in a first portion 310 of waveguide 306 and a second grating 316 disposed in a second portion 314 of waveguide 306. The outer diameter of the large diameter optical waveguide may be at least 300 μm. For some embodiments, large diameter optical waveguide 306 may be a monolithic glass assembly.

For some embodiments, first portion 310 of waveguide 306 may be positioned inside frame assembly 304 (e.g., with no part of first portion 310 protruding from the frame assembly), second portion 314 of waveguide 306 may protrude from frame assembly 304, and the second grating 316 may be disposed outside frame assembly 304, as depicted in FIG. 3. In another embodiment, first portion 310 and second portion 314 of waveguide 306 may be positioned inside frame assembly 304, such that first and second gratings 312, 316 are both disposed inside the frame assembly.

In an embodiment, large diameter optical waveguide 306 may have a "dog-bone" shape as described above. First portion 310 may include a narrow portion of the dog-bone shape, and second portion 314 may include a piston portion of the dog-bone shape.

A first end of waveguide 306 may be coupled to a first optical fiber 318 that propagates light to interrogate the first and second gratings. A second end of waveguide 306 may be coupled to a second optical fiber 320 that propagates light to an optical device, such as another sensing assembly or a fiber Bragg grating (FBG). Assembly 300 may be a single-ended assembly (i.e., an assembly at the end of a fiber optic strand) or a pass-through assembly (i.e., an assembly allowing other fiber optic sensors to be coupled via additional lengths of optical fiber).

Flexible member 308 may be configured to interact with a fluid outside housing 302, and a first end of compressible frame assembly 304 may be coupled to flexible member 308 such that the frame assembly compresses or expands radially in response to changes in pressure or temperature of the fluid. Large diameter optical waveguide 306 may be mounted in compressible frame assembly 304 such that when frame assembly 304 is compressed radially, large diameter optical waveguide 306 is expanded axially. Frame assembly 304 may act as a mechanical amplifier when translating the movement of flexible member 308 to optical waveguide 306, thereby increasing the sensitivity of the sensing assembly. In an embodiment, the first grating 312 may be sensitive to changes in pressure of the fluid, and the second grating 316 may not be sensitive to these changes. Both gratings may be sensitive to temperature.

In an embodiment, large diameter optical waveguide 306 may have one or more features to assist holding of the waveguide by frame assembly 304. For example, optical waveguide 306 may have one or more members configured to be grasped by a clamp, may be shaped such that one or more members of optical waveguide 306 can be held in place by frame assembly 304, or any other feature allowing the waveguide 306 to be held by the frame assembly 304.

In operation, sensing assembly 300 may be positioned in production tubing 106 such that the wall of housing 302 (e.g., a portion of the wall opposite flexible member 308) is attached, mounted, or otherwise mechanically coupled to the production tubing and such that flexible member 308 is in fluid communication with wellbore fluids in the production tubing. Pressure changes imparted on flexible member 308 cause frame assembly 304 to expand or contract radially within housing 302, which leads the frame assembly 304 to shorten or lengthen axially, respectively. Namely, as pressure imparted on flexible member 308 increases, frame assembly 304 extends a greater axial distance, and as pressure imparted on flexible member 308 decreases, frame assembly 304 shortens axially. The axial expansion or contraction of frame assembly 304 imparts axial force (pulling or pushing, also referred to as straining or compressing) on optical waveguide 306, causing optical waveguide 306 to lengthen or shorten axially, respectively, in reaction to force exerted radially on housing 302. The expansion or contraction of optical waveguide 306 causes the characteristic wavelength of gratings 312 and/or 316 to change. An interrogation may be performed by sensing unit 110 by transmitting one or more pulses of light to gratings 312 and/or 316, and the reflected wavelength from gratings 312 and/or 316 may be used to determine pressure and/or temperature at the location of sensing assembly 300.

Example Sensing Assembly Having
Frame-Mounted Cane Element with End Loading

Figure 4:
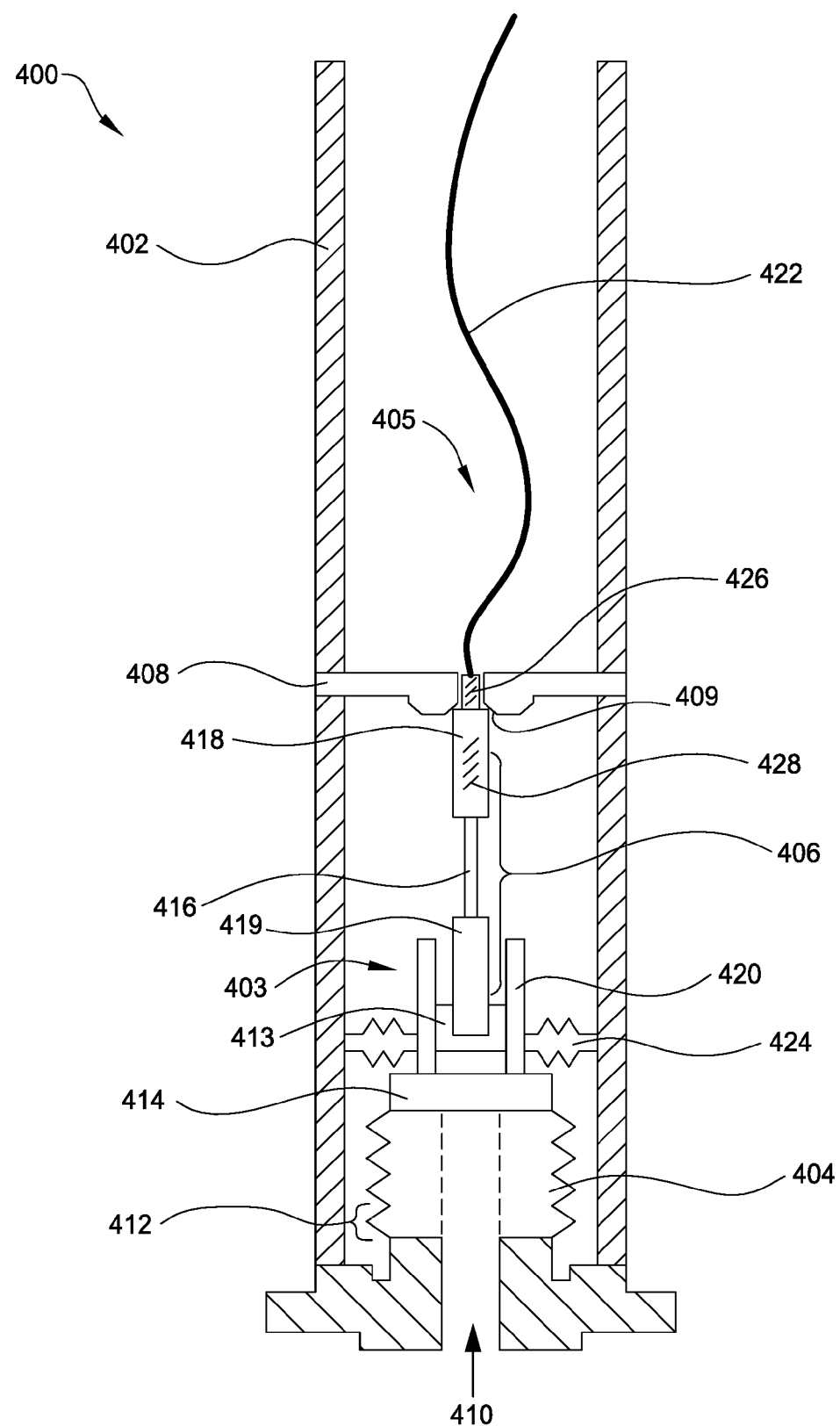
FIG. 4 is a schematic cross-sectional view of a small profile optical sensing assembly with an optical sensor disposed outside a compressible element and axially reactive to pressure changes, according to an embodiment of the present invention.

FIG. 4 illustrates an embodiment of a small profile pressure and temperature sensing assembly 400. Sensing assembly 400 may be one of the sensors 112 deployed in the production tubing 106 as described above with respect to FIG. 1. As such, sensing assembly 400 may be designed to operate in environments having an ambient temperature in excess of 250° C. Sensing assembly 400 may include a housing 402, a compressible element 404, and a large diameter optical waveguide 406.

Housing 402 may have a divider 408 for separating a first volume 403 from a second volume 405 inside the housing and a port 410 disposed in an end of the housing through which fluid may pass. Housing 402 may be composed of an outer tubing having an outer diameter of at most ⅜ inches which may be suitable for use in coiled tubing deployments, as well as in traditional production tubing. For some embodiments, the sensing assembly 400 may fit inside a small diameter tube (e.g., ¼").

Compressible element 404 (e.g., a bellows assembly or a diaphragm) may be disposed in first volume 403. A first end 412 of compressible element 404 may be attached, mounted, or otherwise coupled to the end of housing 402, and a second end 414 of compressible element 404 may be sealed (e.g., with an end cap). An internal volume of compressible element 404 may be in fluid communication with port 410 of housing 402 such that wellbore fluids (e.g., in production tubing 106 external to housing 402) may interact with second end 414, forcing compressible element 404 to compress or expand axially as the pressure of the wellbore fluids decreases or increases, respectively.

Waveguide 406 may be disposed between and mechanically coupled to divider 408 and second end 414. For some embodiments, waveguide 406 may have a first grating 426 disposed in a first portion 416 of waveguide 406 and may have a second grating 428 disposed in a second portion 418 of waveguide 406. For other embodiments, waveguide 406 may have first grating 426 disposed in a part of second portion 418 protruding into a bore of divider 408 and may have second grating 428 disposed in another part of second portion 418 located in first volume 403, as illustrated in FIG. 4. In this manner, the second grating 428 may be sensitive to the pressure applied via the port 410, while the first grating 426 may not be, such that the sensing assembly 400 may act as a pressure and temperature sensor. The outer diameter of large diameter optical waveguide 406 may be at least 300 μm, including the first portion 416. For some embodiments, waveguide 406 may be a monolithic glass assembly.

Divider 408 may have or may be coupled to a first seat 409 (e.g., a frustoconical seat) configured to receive and mate with second portion 418 of waveguide 406. Waveguide 406 may be coupled to divider 408 via the first seat 409 such that when compressible element 404 is expanded axially, waveguide 406 is forced axially against the first seat. Second end 414 of compressible element 404 may include or may be coupled to a second seat 413 configured to receive and mate with a third portion 419 (e.g., a piston portion) of waveguide 406. Waveguide 406 may be coupled to second end 414 via the second seat, such that when compressible element 404 is expanded axially, second seat 413 is forced axially against third portion 419. Waveguide 406 may have one or more features to assist coupling of the waveguide to at least one of first seat 409 or second seat 413.

In an embodiment, one or more flexible members 424 may be coupled between second seat 413 and one or more sidewalls of housing 402 as shown in FIG. 4. These flexible members 424 may be used, for example, to help maintain the force on waveguide 406 in an axial direction, such that there is a reduced or no radial force vector component. In other words, the loading of waveguide 406 is coaxial with the mounting of the waveguide within housing 402 by flexible members 424.

For some embodiments, second seat 413 may include or be coupled to a ball (not shown) for contact between the second seat and second end 414 of compressible element 404. This ball contact may assist compression of second seat 413 and waveguide 406, even when the forces on the second end of the compressible element are not perfectly aligned with housing 402 (i.e., not axial).

In an embodiment, a biasing element may be used to maintain waveguide 406 in compression. The biasing element may include, for example, one or more pre-load pins 420 between second seat 413 and second end 414 of compressible element 404, as portrayed in FIG. 4. The one or more pre-load pins may be, for example, affixed in position (e.g., by welding) with the compressible element in a compressed state and large diameter optical waveguide 406 mounted between first and second seats 409, 413.

For some embodiments, waveguide 406 may have a "dog-bone" shape, comprising first, second, and third portions 416, 418, 419. First portion 416 may include a narrow portion of the dog-bone shape, which is disposed in first volume 403. Second portion 418 may include a piston portion of the dog-bone shape, and third portion 419 may include another piston portion.

Waveguide 406 may be coupled (e.g., via a pigtail) to an optical fiber 422 that propagates light to interrogate first and second gratings 426, 428. Optical fiber 422 may pass from second portion 418 through a bore in divider 408 to second volume 405. Optical fiber 422 may be coupled to optical fiber 114 via fiber splicing, for example.

In operation, sensing assembly 400 may be positioned within production tubing 106 such that compressible element 404 is in fluid communication with wellbore fluids within the production tubing via port 410. As the pressure of the wellbore fluids increases within the internal volume of compressible element 404, the fluids push harder against second end 414, thereby further axially compressing waveguide 406. In contrast, as the pressure of the wellbore fluids decreases, the force on the second end 414 of compressible element 404 lessens, thereby reducing the axial compression on waveguide 406. The changes in axial compression cause changes to the reflectivity characteristics of gratings 426 and 428, which may be amplified by the dog-bone shape of waveguide 406. Sensing unit 110 may interrogate gratings 426 and/or 428 and, based on the reflected Bragg wavelength of the gratings, determine pressure and/or temperature at the location of sensing assembly 400.

Figures 5A, 5B:
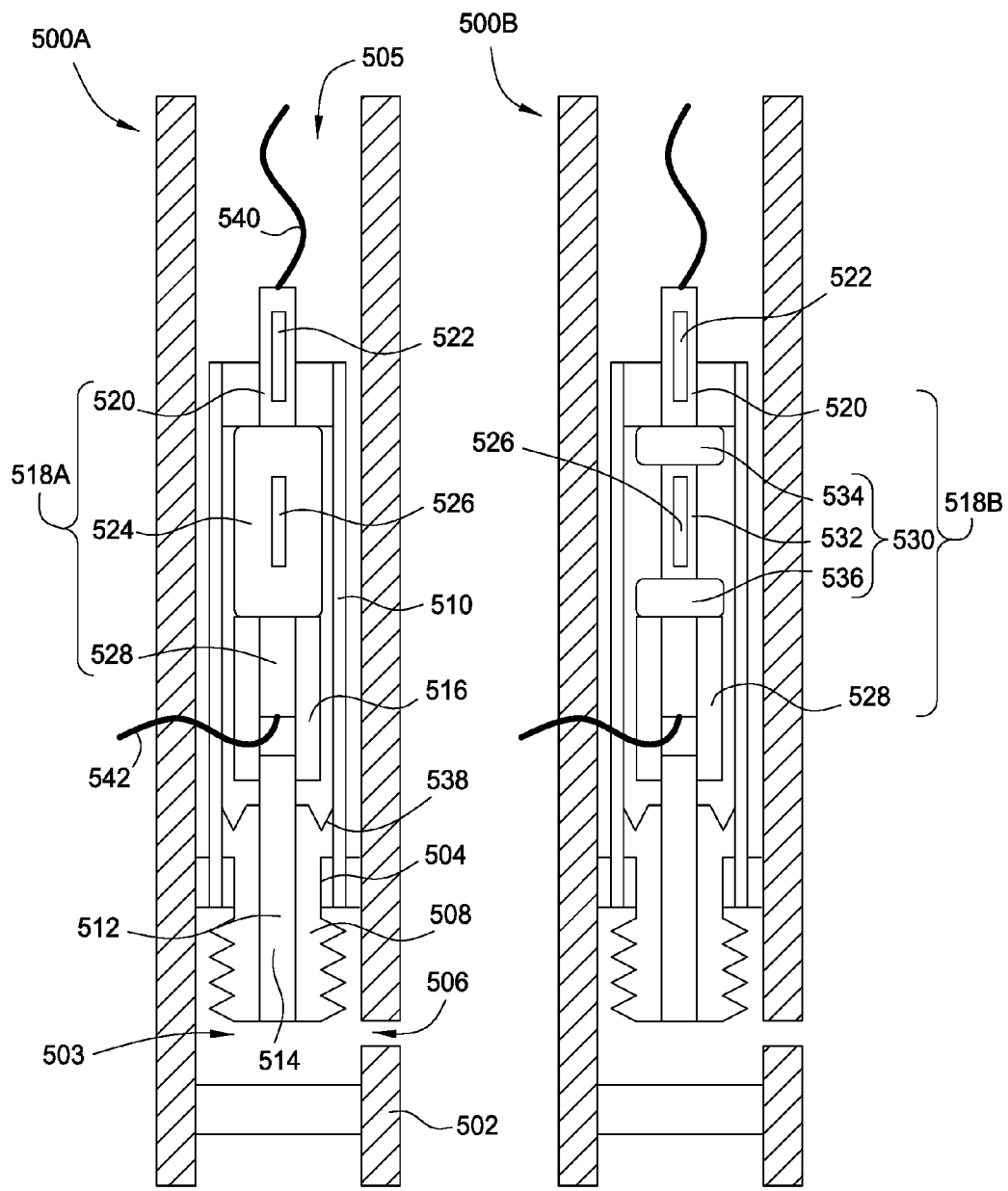
FIG. 5A is a schematic cross-sectional view of a side-ported small profile optical sensing assembly with an optical sensor disposed inside an internal framing and axially reactive to pressure changes imparted through a compressible element, according to an embodiment of the present invention.
FIG. 5B is a schematic cross-sectional view of a side-ported small profile optical sensing assembly with a dog-bone optical sensor disposed inside an internal framing and axially reactive to pressure changes imparted through a compressible element according to an embodiment of the present invention.

Example Sensing Assembly Having Frame-Mounted Cane Element with Side-Ported Fluid Entry FIGS. 5A and 5B illustrate embodiments of a small profile pressure and temperature sensing assembly 500. Sensing assembly 500 may be one of the sensors 112 deployed in the production tubing 106 as described above with respect to FIG. 1. As such, sensing assembly 500 may be designed to operate in environments having an ambient temperature in excess of 250° C.

Sensing assembly 500 may include an outer housing 502, divider 504, fluid entry port 506, compressible element 508, inner housing 510, pressure imparting member (e.g., a rod) 512, and large diameter optical waveguide 518. Divider 504 may separate a first volume 503 from a second volume 505 inside outer housing 502. Inner housing 510 may be attached or otherwise mechanically coupled to outer housing 502 via divider 504. Inner housing 510 may be disposed in second volume 505 inside outer housing 502, with a first end coupled to divider 504. In some embodiments, outer housing 502 may be composed of an outer tubing having an outer diameter of at most ⅜ inches, which may be suitable for deploying the assembly in coiled tubing.

Fluid entry port 506 may provide a port through outer housing 502 to the first volume inside outer housing 502, and compressible element 508 may be disposed in the first volume. A first end of compressible element 508 may be coupled to divider 504, and a second end of compressible element 508 may be sealed (e.g., with an end cap).

Large diameter optical waveguide 518 may be at least partially disposed in inner housing 510. In some embodiments, waveguide 518 may be waveguide 518a as shown in FIG. 5A. As illustrated, waveguide 518a may be composed of a first portion 520, a second portion 524, and a third portion 528. A first grating 522 may be disposed in first portion 520 of waveguide 518a, and a second grating 526 may be disposed in second portion 524 of waveguide 518a. Second portion 524 may be a single member having a diameter larger than that of the first portion 520 and third portion 528 of waveguide 518a.

In another embodiment, waveguide 518 may be waveguide 518b as shown in FIG. 5B. As illustrated, waveguide 518b may be composed of a first portion 520, a second portion 530, and a third portion 528. Second portion 530 may have a "dog-bone" shape, which has two piston portions 534 and 536 connected by a piston rod 532 (i.e., a narrow portion) as illustrated in FIG. 5B. A first piston portion 534 may be disposed between first portion 520 of waveguide 518 and piston rod 532, and a second piston portion 536 may be disposed between piston rod 532 and third portion 528 of waveguide 518. First grating 522 may be disposed within first portion 520 of waveguide 518b, and second grating 526 may be disposed within piston rod 532 of second portion 530.

The outer diameter of the large diameter optical waveguide may be at least 300 μm. For some embodiments, large diameter optical waveguide 518 may be a monolithic glass assembly.

Large diameter optical waveguide 518 is coupled to a second end of inner housing 510. In some embodiments, first portion 520 of waveguide 518 passes through the second end of inner housing 510.

Pressure imparting member 512 may be composed of a first portion 514 and a second portion 516. First portion 514 of pressure imparting member 512 may pass through a bore in divider 504 and may be disposed within an internal volume of compressible element 508. First portion 514 of pressure imparting member 512 may be coupled to the second end of compressible element 508, and second portion 516 of pressure imparting member 512 may be coupled to waveguide 518. The second end of pressure imparting member 512 may abut second portion 524 or 530 of waveguide 518.

Second portion 516 of pressure imparting member 512 may have one or more features configured to hold large diameter optical waveguide 518. For example, second portion 516 may have an internal volume sized to hold, within the internal volume, third portion 528 of waveguide 518. One or more of the features configured to hold waveguide 518 may further provide an opening for coupling waveguide 518 to an optical fiber that can propagate light to interrogate first and second gratings 522, 526 or another optical sensing assembly.

For some embodiments, one or more flexible members 538 may be disposed between and coupled to pressure imparting member 512 and one or more inner walls of inner housing 510.

In an embodiment, compressible element 508 is a bellows assembly. The bellows assembly may be, for example, an edge-welded bellows (also referred to as diaphragm bellows), convoluted bellows (also known as formed bellows), or any other type of bellows assembly appropriate for use in a downhole production environment. The bellows assembly provides fluid isolation and amplification of the pressure imparted from production fluids entering sensing assembly 500 through fluid entry port 506. A first end of compressible element 508 may be mounted to divider 504 such that compressible element 508 compresses or expands axially in response to changes in pressure of a fluid in first volume 503 of outer housing 502.

For some embodiments, first portion 520 of optical waveguide 518 may be coupled (e.g., via a pigtail) to a first optical fiber 540 that propagates light to interrogate the first grating 522 and second grating 526. A third portion 528 of optical waveguide 518 may be coupled (e.g., via a pigtail) to a second optical fiber 542 that propagates light to an optical device, such as another sensing assembly or a fiber Bragg grating. Sensing assembly 500 may be a single-ended assembly (i.e., an assembly at the end of a fiber optic strand without second optical fiber 542) or a pass-through assembly (i.e., an assembly allowing other fiber optic sensors to be coupled via second optical fiber 542). Thus, second optical fiber 542 may be optional. When included, sensing assembly 500 (e.g., outer housing 502) may be modified sufficiently to accommodate second optical fiber 542.

During operation, sensing assembly 500 may be positioned within production tubing 106 such that fluid entry port 506 is exposed to production fluids within the production tubing. Fluid entering outer housing 502 through fluid entry port 506 may exert axial pressure on compressible element 508, which may in turn impart an axial loading on waveguide 518. For example, waveguide 518 may be forced axially against the second end of inner housing 510 when compressible element 508 is compressed axially. Changes in the compression imparted on optical waveguide 518 may alter the characteristic wavelengths of gratings 522 and 526. Interrogation of gratings 522 and 526 by sensing unit 110 may thus be used to detect changes in pressure and/or temperature at the location of sensing assembly 500.

Figure 6A:
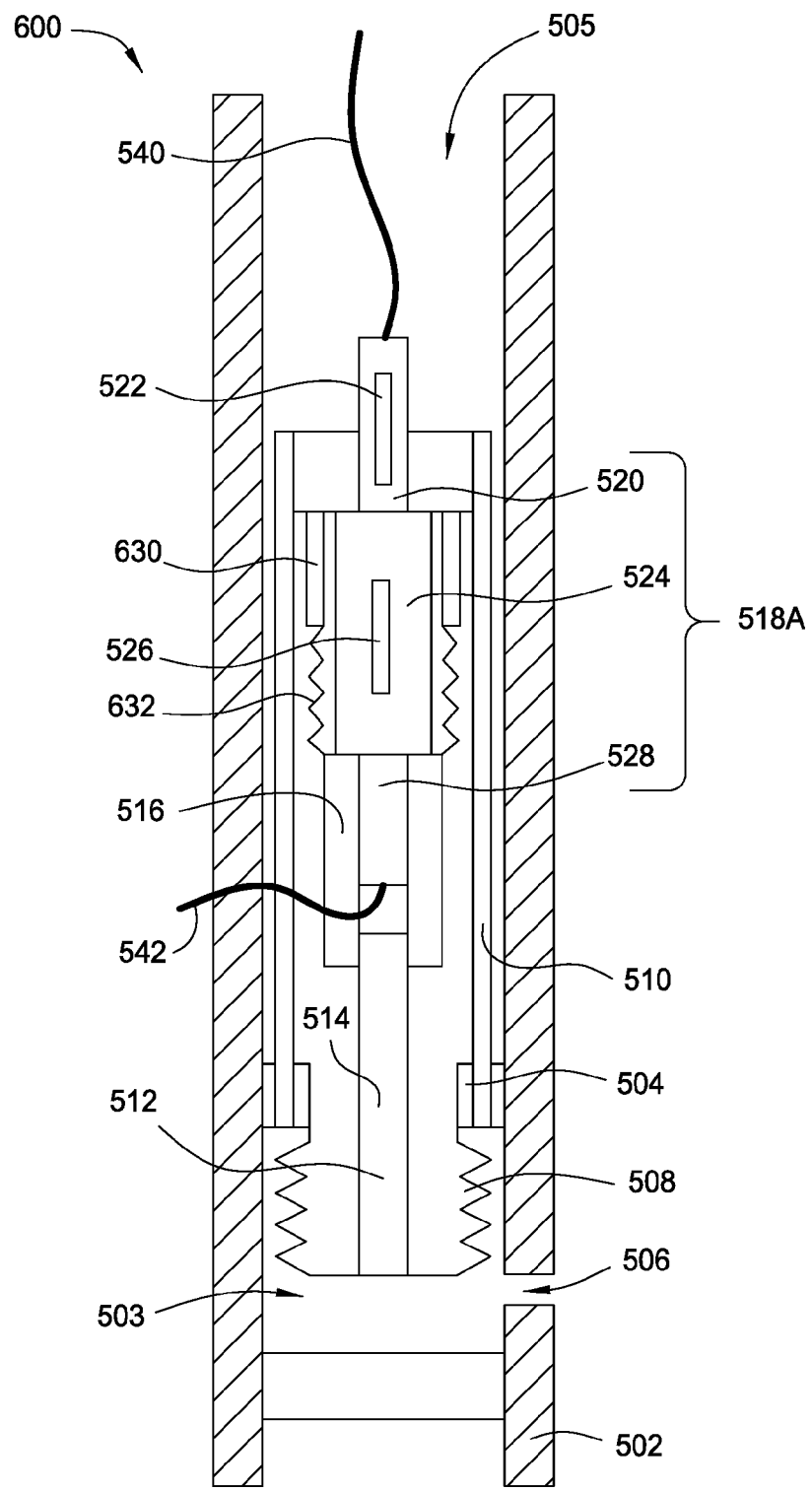
FIG. 6A is a schematic cross-sectional view of a side-ported small profile optical sensing assembly with an optical sensor partially disposed within a flexible member and disposed inside an internal framing, and axially reactive to pressure changes imparted through a compressible element, according to an embodiment of the present invention.

FIG. 6A illustrates an embodiment of a small profile optical sensing assembly 600 suitable for measuring pressure and/or temperature. Sensing assembly 600 is similar to the sensing assembly 500 illustrated in FIG. 5A, but with flexible members 538 replaced by a flexible member 632 surrounding at least a portion of waveguide 518. One or more retaining members 630 may be attached or otherwise mechanically coupled to the first end of inner housing 510, and flexible member 632 may be disposed between and coupled to second portion 516 of pressure imparting member 512 and waveguide 518. For example, flexible member 632 may be a tubular flexure which may encircle large diameter optical waveguide 518. In an embodiment, flexible member 632 may be disposed between retaining members 630 and pressure imparting member 512. The length of retaining members 630 may be less than the length of second portion 524 of waveguide 518, and the length of flexible member 632 may be the difference between the length of second portion 524 of waveguide 518 and the length of retaining members 630. Flexible member 632 serves to ensure axial alignment and motion of pressure imparting member 512 and waveguide 518.

Figure 6B:
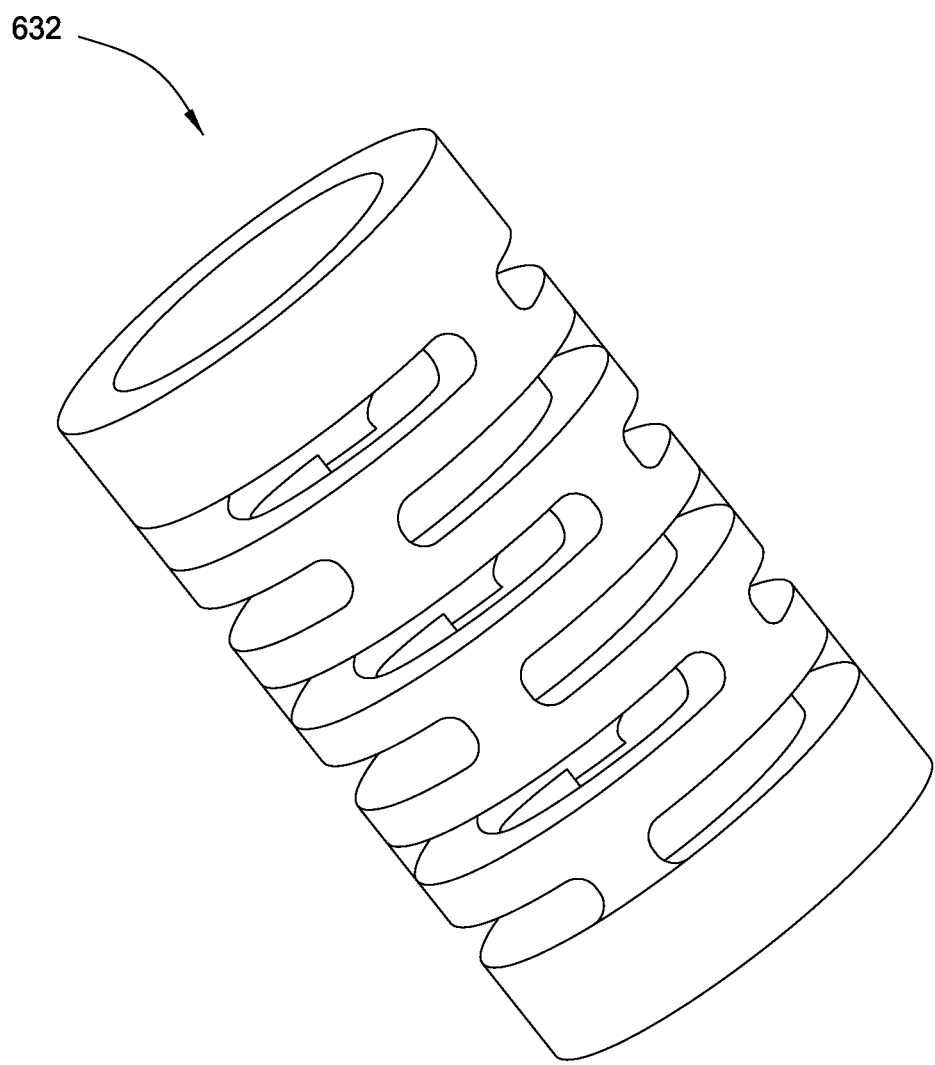
FIG. 6B illustrates an example flexible member that may be disposed around at least a portion of the optical sensor in FIG. 6A, according to an embodiment of the present invention.

A detailed view of an example flexible member 632 is provided in FIG. 6B. As illustrated, flexible member 632 may be a monolithic structure having a plurality of openings. The plurality of openings may be noncontiguous.

Example Diaphragm Tube Sensing Assembly

Figure 7:
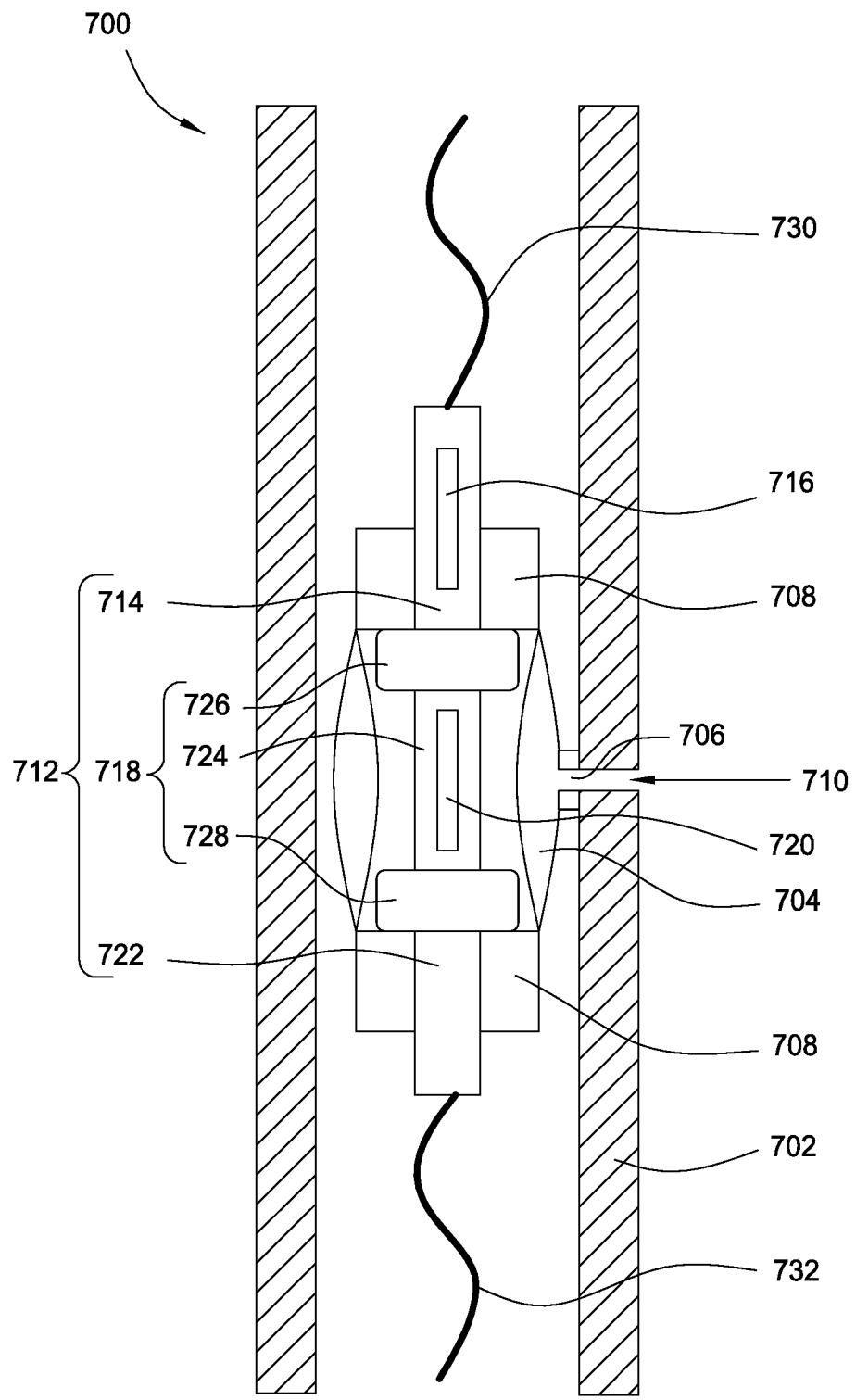
FIG. 7 is a schematic cross-sectional view of a side-ported small profile optical sensing assembly with an optical sensor disposed in an expandable tube and axially reactive to pressure changes imparted through the expansion or contraction of the expandable tube, according to an embodiment of the present invention.

FIG. 7 illustrates another embodiment of a small profile pressure and temperature sensing assembly 700. Sensing assembly 700 may be one of the sensors 112 deployed in the production tubing 106 as described above with respect to FIG. 1. As such, sensing assembly 700 may be designed to operate in environments having an ambient temperature greater than 250° C.

Sensing assembly 700 may include a housing 702, an expandable tube 704, a fluid port 710, and a large diameter optical waveguide 712. In some embodiments, housing 702 may be composed of an outer tubing having an outer diameter of at most ⅜ inches, which may be suitable for deploying the assembly in coiled tubing. Housing 702 may have fluid port 710 positioned through a wall of the housing. Expandable tube 704 may have an internal volume and an inlet 706 coupled to port 710 of housing 702 for fluid communication between the internal volume of expandable tube 704 and an external volume of housing 702. First and second holding members 708 may be coupled to the expandable tube 704.

Large diameter optical waveguide 712 may be composed of a first portion 714 having a first grating 716, a second portion 718 having a second grating 720, and a third portion 722. The outer diameter of the large diameter optical waveguide may be at least 300 µm. For some embodiments, large diameter optical waveguide 712 may be a monolithic glass assembly.

First holding member 708 may hold first portion 714 of waveguide 712, and second holding member 708 may hold third portion 722 of waveguide 712. In an embodiment, first and second holding members 708 hold large diameter optical waveguide 712 such that pressure increases in a fluid inside the internal volume of expandable tube 704 expands the expandable tube. The expansion of expandable tube 704 thus pulls first and second holding members 708 closer together, axially compressing waveguide 712.

In an embodiment, first and second holding members 708 may be ring-shaped. In this case, first portion 714 of waveguide 712 may pass through a bore of a first holding member 708, and third portion 722 of waveguide 712 may pass through a bore of second holding member 708. Second portion 718 of waveguide 712 may be disposed between the first and second holding members 708.

In an embodiment, expandable tube 704 may be ring-shaped and encircle waveguide 712. Inlet 706 may be disposed in an outer sidewall of the ring-shaped tube.

In one embodiment, second portion 718 of waveguide 712 may have a greater outer diameter than first portion 714 of waveguide 712. In another embodiment, large diameter optical waveguide 712 may have a "dog-bone" shape as illustrated in FIG. 7. For example, second portion 718 of waveguide 712 may comprise a rod portion 724 having a first end and a second end. A first piston portion 726 may be disposed at the first end of rod portion 724, and a second piston portion 728 may be located at the second end of rod portion 724.

For some embodiments, first portion 714 of optical waveguide 712 may be coupled (e.g., via a pigtail) to a first optical fiber 730 that propagates light to interrogate first grating 716 and second grating 720. Third portion 722 of optical waveguide 712 may be coupled to a second optical fiber 732 that propagates light to an optical device, such as another sensing assembly or a fiber Bragg grating. Sensing assembly 700 may be a single-ended assembly (i.e., an assembly at the end of a fiber optic strand) or a pass-through assembly (i.e., an assembly allowing other fiber optic sensors to be coupled via additional lengths of optical fiber).

In operation, sensing assembly 700 may be positioned in production tubing 106 such that the wall of housing 702 opposite fluid port 710 is attached, mounted, or otherwise mechanically coupled to the production tubing and such that fluid port 710 is positioned to allow production fluids to flow into the space between an inner wall of expandable tube 704 coupled to inlet 706 and fluid port 710. As pressure increases within the wellbore, expandable tube 704 is filled and expanded radially (i.e., towards the center of sensing assembly 700), causing first and second holding members 708 to compress axially. Likewise, as pressure decreases within the wellbore, the amount of radial expansion in expandable tube 704 decreases, allowing holding members 708 to expand axially. The axial expansion or contraction of holding members 708 imparts axial force on optical waveguide 712, causing optical waveguide 712 to lengthen or shorten axially, respectively. The expansion or contraction of optical waveguide 712 causes the characteristic wavelengths of gratings 716 and 720 to change. Sensing unit 110 may perform an interrogation by transmitting one or more pulses of light to gratings 716 and 720. The reflected wavelengths from gratings 716 and 720 may be used to determine pressure and/or temperature at the location of sensing assembly 700.

Example Internally Ported Sensing Assembly

Figure 8:
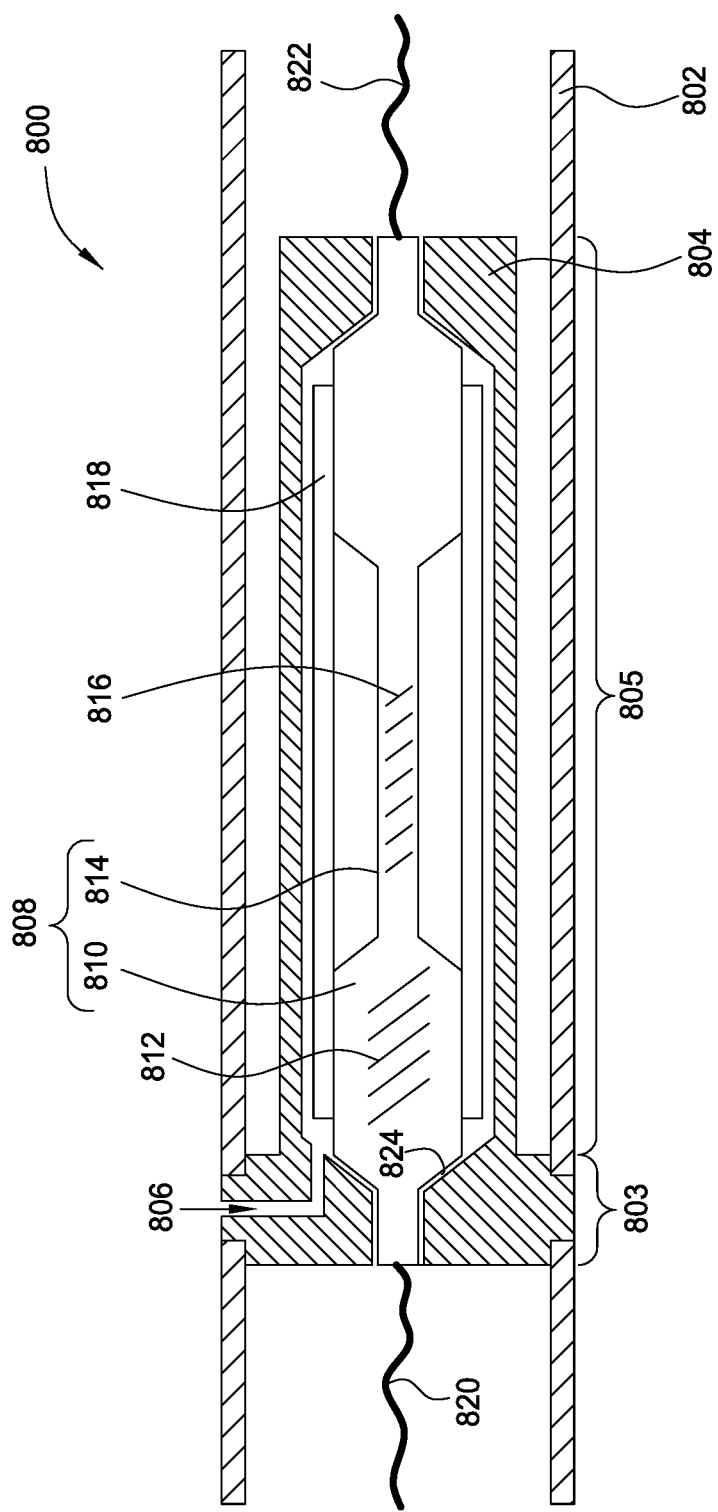
FIG. 8 is a schematic cross-sectional view of an internally ported small profile optical sensing assembly having an optical sensor disposed within an internal housing and radially reactive to pressure changes imparted by fluids entering the internal housing, according to an embodiment of the present invention.

FIG. 8 illustrates another embodiment of a small profile pressure and temperature sensing assembly 800. Sensing assembly 800 may be one of the sensors 112 deployed in the production tubing 106 as described above with respect to FIG. 1. As such, sensing assembly 800 may be designed to operate in environments having an ambient temperature greater than 250° C.

Sensing assembly 800 may include an outer housing 802, an inner housing 804 (e.g., a pressure housing), fluid port 806, and a large diameter optical waveguide 808. In some embodiments, outer housing 802 may be composed of an outer tubing having a thickness of at most ¼ inches, which may be suitable for deploying the assembly in coiled tubing. The outer tubing may be an armored tubing. Inner housing 804 may be at least partially disposed within outer housing 802. In some embodiments, inner housing 804 may comprise a first portion 803 attached to outer housing 802 and a second portion 805 that may be narrower in diameter than the first portion. Fluid port 806 may be formed from an exterior-facing opening in inner housing 804 and may allow for fluid communication between an internal volume of inner housing 804 and a volume external to outer housing 802. Large diameter optical waveguide 808 may be disposed in the internal volume of inner housing 804. In an embodiment, fluid port 806 is part of the inner housing 804.

Large diameter optical waveguide 808 may have at least a first portion 810 with a first grating 812 and a second portion 814 with a second grating 816 disposed within a portion of waveguide 808. First portion 810 may have a greater outer diameter than second portion 814, which may have an outer diameter of at least 300 µm. Waveguide 808 may, in some embodiments, have a substantially "dog-bone" shape, as depicted in FIG. 8. For example, first portion 810 of waveguide 808 may be a piston portion, and second portion 814 of waveguide 808 may be a piston rod portion. The first and third portions of waveguide 808 may have, for example, a frustoconical shape. The first and third portions of waveguide 808 are mated with similarly shaped seats in the first and second ends of inner housing 804. A glass-to-metal seal interface 824 may provide a seal between a seat of inner housing 804 and waveguide 808 (e.g., between the first seat of inner housing 804 and the first portion of waveguide 808, or between the second seat of inner housing 804 and the third portion of waveguide 808) such that the interior volume of inner housing 804 is substantially sealed from fluid entry other than through fluid port 806. In some embodiments, one or more V-seals may be disposed between at least one of the first seat of inner housing 804 and the first portion 810 of waveguide 808, or the second seat of inner housing 804 and the third portion of waveguide 808.

In some embodiments, at least a portion of waveguide 808 may be disposed within a glass tubing 818. Glass tubing 818 may be, for example, gold-plated to prevent swelling or detrimental effects that may be imparted to waveguide 808 from contact with hydrocarbons. In some embodiments, an enclosed volume between waveguide 808 and glass tubing 818 may be filled with air.

The outer diameter of large diameter optical waveguide 808 may be at least 300 µm. For some embodiments, large diameter optical waveguide 808 may be a monolithic glass assembly.

A first end of waveguide 808 may be coupled to an optical fiber 820 that propagates light to interrogate gratings 812 and 816. A second end of waveguide 808 may be coupled to a second optical fiber 822 that propagates light to an optical device, such as another sensing assembly or a fiber Bragg grating (FBG). Sensing assembly 800 may be a single-ended assembly (i.e., an assembly at the end of a fiber optic strand) or a pass-through assembly (i.e., an assembly allowing other fiber optic sensors to be coupled via additional lengths of optical fiber). At least one of the optical fibers 820 or 822 or at least one end of waveguide 808 may pass through a bore in an end of inner housing 804.

In operation, sensing assembly 800 may be positioned in production tubing 106 such that the wall of outer housing 802 opposite fluid port 806 is attached, mounted, or otherwise mechanically coupled to the production tubing. Production fluids may enter inner housing 804 through fluid port 806 and impart pressure radially on waveguide 808. Radial pressure imparted on glass tubing 818 may cause waveguide 808 to expand or contract axially, which in turn may cause the characteristic wavelength of gratings 812 and 816 to change. Sensing unit 110 may perform an interrogation by transmitting one or more pulses of light to gratings 812 and 816, and the reflected wavelengths from gratings 812 and 816 may be used to determine pressure and/or temperature at the location of sensing assembly 800.

CONCLUSION

By using cane-based Bragg gratings in compression in a mechanical frame coupled to a diaphragm or bellows assembly that is exposed to external pressure, embodiments of the present invention provide stable, accurate, repeatable pressure and temperature sensors with small profiles suitable for desired applications.

While the foregoing is directed to embodiments of the present invention, other and further embodiments of the invention may be devised without departing from the basic scope thereof, and the scope thereof is determined by the claims that follow.

The invention claimed is:

1. An optical sensing assembly comprising:
an outer housing;
an inner housing at least partially disposed in the outer housing;
a port for fluid communication between an internal volume of the inner housing and a volume external to the outer housing, wherein the port is part of the inner housing; and
a large diameter optical waveguide disposed in the internal volume of the inner housing, wherein the waveguide comprises:
a first portion with a first grating; and
a second portion with a second grating, wherein the outer diameter of the large diameter optical waveguide is at least 300 µm.

2. The assembly of claim 1, further comprising a glass tubing, wherein at least a part of the large diameter optical waveguide is disposed in the glass tubing.

3. The assembly of claim 2, wherein the glass tubing comprises a gold-plated glass.

4. The assembly of claim 2, wherein an enclosed volume between the large diameter optical waveguide and the glass tubing is filled with air.

5. The assembly of claim 1, wherein the first portion has a greater outer diameter than the second portion and wherein the outer diameter of the second portion is the at least 300 µm.

6. The assembly of claim 5, wherein the large diameter optical waveguide has a dog-bone shape, wherein the first portion comprises a piston portion, wherein the second portion comprises a narrow portion, and wherein the large diameter optical waveguide comprises a third portion having a greater outer diameter than the second portion.

7. The assembly of claim 6, wherein a first end of the inner housing comprises a first seat for mating with the first portion of the large diameter optical waveguide and wherein a second end of the inner housing comprises a second seat for mating with the third portion of the large diameter optical waveguide.

8. The assembly of claim 7, further comprising one or more V-seals between at least one of:
the first seat of the inner housing and the first portion of the large diameter optical waveguide; or
the second seat of the inner housing and the third portion of the large diameter optical waveguide.

9. The assembly of claim 6, wherein at least one of the first portion or the third portion of the large diameter optical waveguide has a frustoconical shape.

10. The assembly of claim 1, wherein at least one end of the large diameter optical waveguide is coupled to an optical fiber that propagates light to interrogate the first and second gratings.

11. The assembly of claim 10, wherein at least one of the optical fiber or the at least one end of the large diameter optical waveguide passes through a bore in an end of the inner housing.

12. The assembly of claim 1, wherein the outer housing has an outer diameter of at most ¼ inches.

13. The assembly of claim 1, wherein the large diameter optical waveguide is a monolithic glass assembly.

14. The assembly of claim 1, wherein the outer housing comprises armored tubing.

15. The assembly of claim 1, wherein the port passes radially through the outer housing with respect to an axis of the waveguide.

16. An optical sensing assembly comprising:
an outer housing;
an inner housing at least partially disposed in the outer housing;
a port for fluid communication between an internal volume of the inner housing and a volume external to the outer housing; and
a large diameter optical waveguide disposed in the internal volume of the inner housing, wherein the waveguide comprises:
a first portion with a first grating;
a second portion with a second grating, wherein the outer diameter of the large diameter optical waveguide is at least 300 µm; and
a third portion having a greater outer diameter than the second portion, wherein a first end of the inner housing comprises a first seat for mating with the first portion of the large diameter optical waveguide and wherein a second end of the inner housing comprises a second seat for mating with the third portion of the large diameter optical waveguide.

17. The assembly of claim 16, wherein the first portion has a greater outer diameter than the second portion and wherein the outer diameter of the second portion is the at least 300 µm.

18. The assembly of claim 17, wherein the large diameter optical waveguide has a dog-bone shape, wherein the first portion comprises a piston portion, and wherein the second portion comprises a narrow portion.

19. The assembly of claim 16, further comprising one or more V-seals between at least one of:
the first seat of the inner housing and the first portion of the large diameter optical waveguide; or
the second seat of the inner housing and the third portion of the large diameter optical waveguide.

20. The assembly of claim 16, wherein:
at least one end of the large diameter optical waveguide is coupled to an optical fiber that propagates light to interrogate the first and second gratings; and
at least one of the optical fiber or the at least one end of the large diameter optical waveguide passes through a bore in the first end or the second end of the inner housing.

21. The assembly of claim 16, wherein at least one of the first portion or the third portion of the large diameter optical waveguide has a frustoconical shape.

* * * * *